US012682593B2

(12) United States Patent
Roy et al.

(10) Patent No.: US 12,682,593 B2
(45) Date of Patent: Jul. 14, 2026

(54) IMAGE SCORING APPARATUS, IMAGE SCORING METHOD AND METHOD OF MACHINE LEARNING

(71) Applicant: RAKUTEN GROUP, INC., Tokyo (JP)

(72) Inventors: Hiya Roy, Tokyo (JP); Mitsuru Nakazawa, Tokyo (JP); Bjorn Stenger, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 450 days.

(21) Appl. No.: 18/029,668

(22) PCT Filed: Sep. 30, 2021

(86) PCT No.: PCT/JP2021/036196
§ 371 (c)(1),
(2) Date: Mar. 31, 2023

(87) PCT Pub. No.: WO2023/053365
PCT Pub. Date: Apr. 6, 2023

(65) Prior Publication Data
US 2024/0362885 A1 Oct. 31, 2024

(51) Int. Cl.
*G06V 10/26* (2022.01)
*G06V 10/774* (2022.01)
*G06V 10/82* (2022.01)

(52) U.S. Cl.
CPC ............ *G06V 10/26* (2022.01); *G06V 10/774* (2022.01); *G06V 10/82* (2022.01)

(58) Field of Classification Search
CPC ...... G06V 10/26; G06V 10/774; G06V 10/82; G06T 2207/20081; G06T 2207/20084;
(Continued)

(56) References Cited

U.S. PATENT DOCUMENTS 12,406,023 B1 * 9/2025 Alvarez Lopez ...... G06N 3/045
2009/0208118 A1 8/2009 Csurka
(Continued)

FOREIGN PATENT DOCUMENTS

CN 111629212 A 9/2020
CN 112802034 A 5/2021
(Continued)

OTHER PUBLICATIONS

Xiang, Yu, et al. "Subcategory-aware convolutional neural networks for object proposals and detection." 2017 IEEE winter conference on applications of computer vision (WACV). IEEE, 2017. https://ieeexplore.ieee.org/abstract/document/7926691 (Year: 2017).*
(Continued)

*Primary Examiner* — Matthew C Bella
*Assistant Examiner* — Andrew B. Jones
(74) *Attorney, Agent, or Firm* — HEA Law PLLC

(57) ABSTRACT

Provided is an information-processing device including a CPU; and a memory storing instructions for causing the information-processing device, when executed by the CPU, to: include at least a machine learning model configured to receive an input image and an attribute as input, and to output at least one region in the input image and an evaluation value for each of the at least one region, wherein, for a common input image, the region and the evaluation value output when one attribute is given are different from the region and the evaluation value output when another attribute different from the one attribute is given.

6 Claims, 19 Drawing Sheets

(58) Field of Classification Search

CPC . G06T 2207/20132; G06T 2207/30196; G06T 7/194; G06T 7/11

See application file for complete search history.

(56) References Cited

U.S. PATENT DOCUMENTS

| | | | |
|---|---|---|---|
| 2019/0050681 A1 | 2/2019 | Tate | |
| 2019/0057515 A1 | 2/2019 | Teixeira et al. | |
| 2019/0370587 A1* | 12/2019 | Burachas | G06T 11/60 |
| 2020/0074634 A1 | 3/2020 | Kecskemethy et al. | |
| 2021/0009080 A1 | 1/2021 | Hu et al. | |
| 2021/0133861 A1 | 5/2021 | Kumar et al. | |
| 2021/0192772 A1 | 6/2021 | Tate | |
| 2021/0344936 A1 | 11/2021 | Liu | |
| 2021/0390700 A1 | 12/2021 | Lee et al. | |
| 2022/0138490 A1 | 5/2022 | Tate | |
| 2022/0269895 A1 | 8/2022 | Barkan et al. | |
| 2022/0269996 A1 | 8/2022 | Nogami | |
| 2022/0277472 A1 | 9/2022 | Birchfield et al. | |
| 2022/0382802 A1 | 12/2022 | Sharifi et al. | |
| 2023/0162051 A1 | 5/2023 | Lv et al. | |

FOREIGN PATENT DOCUMENTS

| | | | |
|---|---|---|---|
| JP | 2000075889 A | 3/2000 | |
| JP | 2019032773 A | 2/2019 | |
| JP | 2020-516427 A | 6/2020 | |
| JP | 2020149641 A | 9/2020 | |
| JP | 2021005301 A | 1/2021 | |
| JP | 2021081793 A | 5/2021 | |
| JP | 2021103347 A | 7/2021 | |
| JP | 2021516646 A | 7/2021 | |
| WO | 2021130856 A1 | 7/2021 | |

OTHER PUBLICATIONS

Yu Xiang et al. "Subcategory-aware Convolutional Neural Networks for Object Proposals and Detection", arxiv.org, Cornell University Library, 201 Olin Library Cornell University Ithaca, NY 14853, Apr. 16, 2016, XP080695853, pp. 1-16.

Search Report of Dec. 15, 2023, for corresponding EP Patent Application No. 21959402.5, pp. 1-11.

Chenyun Wu et.al. "PhraseCut: Language-based Image Segmentation in the Wild", arxiv.org, Cornell University Library, 201 Olin Library Cornell University Ithaca, NY 14853, Aug. 3, 2020, XP081731210, pp. 1-17.

Search Report of Sep. 11, 2023, for corresponding EP Patent Application No. 21950363.8, pp. 1-9.

Office Action of Feb. 10, 2025, for related U.S. Appl. No. 18/029,093, pp. 1-23.

International Search Report of Nov. 22, 2021, for International Patent Application PCT/JP2021/036195, pp. 1-9.

Office Action of Jan. 10, 2023, for related JP application No. 2022-557886, partial English translation pp. 1-5.

Wenguan Wang, Jianbing Shen, "Deep Cropping via Attention Box Prediction and Aesthetics Assessment", [online], International Conference on Computer Vision (ICCV-2017); Published Oct. 2017; Internet <URL:https://openaccess.thecvf.com/content_ICCV_2017/papers/Wang_Deep_Cropping_via_ICCV_2017_paper.pdf>, p. 1-9, (Cited in "Background Art Column" of the specification).

Office Action of Jun. 6, 2025, for related U.S. Appl. No. 18/029,093, pp. 1-24.

* cited by examiner

12b

12d

START

SET CUTOUT WINDOWS X          S01

EXTRACT CANDIDATE WINDOWS $X_{cand}$          S02

$$X_{cand} = \{W | \sum_{x \in W} P(x) > \lambda \sum_{x} P(x)\}$$

SELECT REGION W          S03

END

FIG.15

IMAGE SCORING APPARATUS, IMAGE SCORING METHOD AND METHOD OF MACHINE LEARNING

CROSS-REFERENCE TO RELATED APPLICATION

The present disclosure contains subject matter related to that disclosed in International Patent Application PCT/JP2021/036196 under the Patent Cooperation treaty filed in the Japan Patent Office on Sep. 30, 2021, the entire contents of which are hereby incorporated by reference.

BACKGROUND OF THE INVENTION

1. Field of the Invention

The present invention relates to an image scoring apparatus, an image scoring method, and a method of machine learning.

2. Description of the Related Art

In Wenguan Wang, Jianbing Shen, "Deep Cropping via Attention Box Prediction and Aesthetics Assessment," [online], ICCV-2017, [retrieved on Aug. 13, 2021], Internet <URL: https://openaccess.thecvf.com/content_ICCV_2017/papers/Wang_Deep_Cropping_via_ICCV_2017_paper.pdf>, there is described so-called image cropping, that is, an image processing technology of extracting a principal portion in an image, which involves utilizing an attention map in a convolutional neural network to obtain an aesthetic value, and obtaining a frame of the principal portion to be extracted based on the aesthetic value.

SUMMARY OF THE INVENTION

There is provided an information-processing device including a central processing unit (CPU); and a memory storing instructions for causing the information-processing device, when executed by the CPU, to: include at least a machine learning model configured to receive an input image and an attribute as input, and to output at least one region in the input image and an evaluation value for each of the at least one region, wherein, for a common input image, the at least one region and the evaluation value output when one attribute is given are different from the at least one region and the evaluation value output when another attribute different from the one attribute is given.

There is also provided an information-processing method of causing a computer to execute: inputting an input image and an attribute into a machine learning model, to thereby output at least one region in the input image and an evaluation value for each of the at least one region, wherein, for a common input image, the at least one region and the evaluation value output when one attribute is given are different from the at least one region and the evaluation value output when another attribute different from the one attribute is given.

There is also provided a non-transitory computer-readable information recording medium storing an information-processing program for causing a computer to: input an input image and an attribute into a machine learning model, and thereby output at least one region in the input image and an evaluation value for each of the at least one region, wherein, for a common input image, the at least one region and the evaluation value output when one attribute is given are different from the at least one region and the evaluation value output when another attribute different from the one attribute is given.

There is also provided an information-processing method of causing a computer to execute: training a machine learning model as a heatmap output model by causing the machine learning model to learn through use of teacher data which includes, as a question, an input image and an attribute, and includes, as an answer, a heatmap obtained by combining, in accordance with the attribute, a plurality of intermediate heatmaps obtained from a plurality of learned machine learning models which are different from one another, and generate intermediate heatmaps for input of the input image.

There is also provided an information-processing method of causing a computer to execute: training one machine learning model as a heatmap output model by causing the one machine learning model to learn through use of teacher data which includes, as a question, an input image and an attribute, and includes, as an answer, a heatmap obtained by combining, in accordance with the attribute, a plurality of intermediate heatmaps obtained from a plurality of learned machine learning models which are different from one another, and generate intermediate heatmaps for input of the input image; and training another machine learning model as a region evaluation value output model by causing the another machine learning model to learn through use of teacher data which includes, as a question, the heatmap and includes, as an answer, a region obtained from a learned machine learning model or an algorithm which outputs the region for input of the heatmap and an evaluation value obtained from a learned machine learning model which outputs the evaluation value for a portion of the input image corresponding to the region.

There is also provided an information-processing method of causing a computer to execute: causing a machine learning model to learn through use of teacher data which includes, as a question, an input image and an attribute and includes, as an answer, a region obtained by inputting, into a learned machine learning model or an algorithm which outputs the region for input of a heatmap, a heatmap obtained by combining, in accordance with the attribute, a plurality of intermediate heatmaps obtained from a plurality of learned machine learning models which are different from one another, and generate intermediate heatmaps for input of the input image, and an evaluation value obtained from a learned machine learning model which outputs the evaluation value for a portion of the input image corresponding to the region.

BRIEF DESCRIPTION OF THE DRAWINGS

FIG. 15 is a diagram for illustrating a configuration of the information-processing device according to a first embodiment of the present invention together with an operation at the time when a machine learning model is caused to learn.

DESCRIPTION OF THE EMBODIMENTS

In hitherto known technologies for the image cropping including the technology as disclosed in the related art, the position of the principal portion in the image is determined based on a single evaluation criterion (aesthetic value in the related art).

However, the principal portion of the image intrinsically varies in accordance with a purpose of application of this image. For example, when a photograph image obtained by capturing a scene is used as a landscape, the principal portion is to exist in a thing appearing in a background in the image, while when this photograph image is used as a portrait, the principal portion is to exist in a human image appearing in a foreground in the image. Similarly, when a photograph image obtained by capturing a person is used to identify the person, the principal portion is to exist in a face portion of the person, while when this photograph image is used to introduce fashion, the principal portion is to exist in clothes and accessories of the person in the image.

However, there has hitherto not been known a technology for appropriately executing the image cropping in accordance with the purpose of the image.

The present invention disclosed hereafter enables to appropriately execute image cropping in accordance with a purpose of an image.

Figure 1:
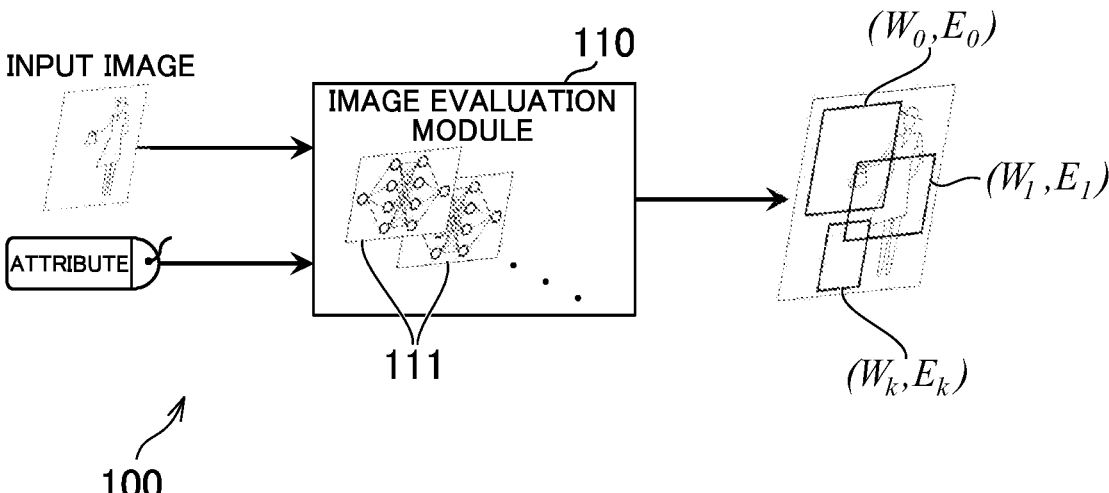
FIG. 1 is a functional 1 diagram of an information-processing device conceptualized in common in various preferred embodiments of the present invention.

FIG. 1 is a functional conceptual diagram of an information-processing device 100 conceptualized in common in various preferred embodiments of the present invention. The information-processing device 100 is implemented by appropriate physical means, for example, a computer for executing an appropriate computer program, implementing functions of FIG. 1.

In short, when a prepared input image is input into an image evaluation module 110, the information-processing device 100 outputs at least one region W of the input image and an evaluation value E for this region Was illustrated in the right side of FIG. 1. In this configuration, a plurality of sets of the region W and the evaluation value E are generally output, and hence those sets are distinguished from one another by adding suffixes in FIG. 1. Moreover, in FIG. 1, for the convenience of illustration, only three sets of the region W and the evaluation value E are illustrated. However, the number of sets may be more than three, and a set of the region W and the evaluation value E to be output may be single depending on the design of the image evaluation module 110.

The region W refers to a region to be a candidate of a "principal portion" of the input image. In this embodiment, a rectangle is exemplified as a shape of the region W for description, but an external shape of the region W may be any shape. Moreover, the image evaluation module 110 may be designed to simultaneously output a plurality of regions W having different shapes. The "principal portion" of the input image refers to an important portion of the input image which attracts attention of a viewer. A detailed description of how the "principal portion" of the input image is to be defined is given later.

Moreover, an attribute is input into the image evaluation module 110 together with the input image. This attribute is information relating to how this input image is used. A specific description of the meaning of this attribute is given later together with the above-mentioned "principal portion."

In the information-processing device 100, the region W and the evaluation value E output for the input image change in accordance with the input attribute. In other words, for a common input image, the region W and the evaluation value E output when one attribute is given and the region W and the evaluation value E output when another attribute different from the one attribute is given are different from each other.

The expression "the region W and the evaluation value E output for the input image change in accordance with the input attribute" does not mean that the region W and the evaluation value E output from the image evaluation module 110 always change when the input attribute changes for a specific input image. However, there may exist a case in which the same (or substantially the same) region W and evaluation value E are output for attributes different from each other by chance depending on a condition such as selection of the input image, which is considered to hardly occur in general. However, when attributes which are different from each other and for which the same region W and evaluation value E are output for a certain input image are input, there always exists at least one different input image for which the image evaluation module 110 outputs regions W and evaluation values E different from each other. Conversely, when there are two attributes for which the same region W and evaluation value E are always output for any input image, those two attributes are not different from each other, but are the same.

Moreover, the image evaluation module 110 includes at least one machine learning model 111. A type and an architecture of the machine learning model are not particularly limited. It is only required to select a suitable model in accordance with a nature of the input image and a progress in the machine learning technology. The deep neural network (DNN) such as the region-based convolutional neural network (R-CNN) can suitably be applied currently. Thus, also in the present disclosure, description is hereinafter given while the machine learning model 111 is assumed to be the DNN, but the use of another model is not restricted. Moreover, "machine learning model" in the present disclosure is not to be interpreted such that an architecture of the machine learning model itself is restricted. That is, it is assumed that even a so-called machine learning pipeline seen in the R-CNN and the like, which is obtained by appropriately combining inputs and outputs of a plurality of neural networks (NN) for machine learning which are also considered as independent of each other to obtain a desired result, is not particularly distinguished, and is thus referred to as "machine learning model." The image evaluation module 110 may cooperate with at least one machine learning model included in an external computer or server, to thereby include the at least one machine learning model.

Description is also given below of technical and practical significance of the above-mentioned information-processing device 100 and meanings of terms used in the present application.

Figure 2:
FIG. 2 is a view of an example of an input image.

FIG. 2 is a view of an example of an input image. A photograph of a person is illustrated in FIG. 2. However, what kind of subject is to be used is not particularly limited. Moreover, it does not matter whether the input image is acquired by actual capturing or by another method (such as an illustration). Moreover, a format of the input image is not particularly limited. Whether the input image is a raster image or a vector image, a resolution, and a format can be freely set. When the input image is input to the image evaluation module 110, however, the input image is at least prepared as electronic data.

Incidentally, a purpose of the information-processing device 100 is to indicate the principal portion of the input image of FIG. 2. When a position and a shape of the principal portion are identified, it is easy to use the principal portion for utilization of the image by applying a subsequent process, for example, trimming. However, it is actually impossible to universally define a "principal portion" even for the simple input image illustrated in the example.

Figure 3:
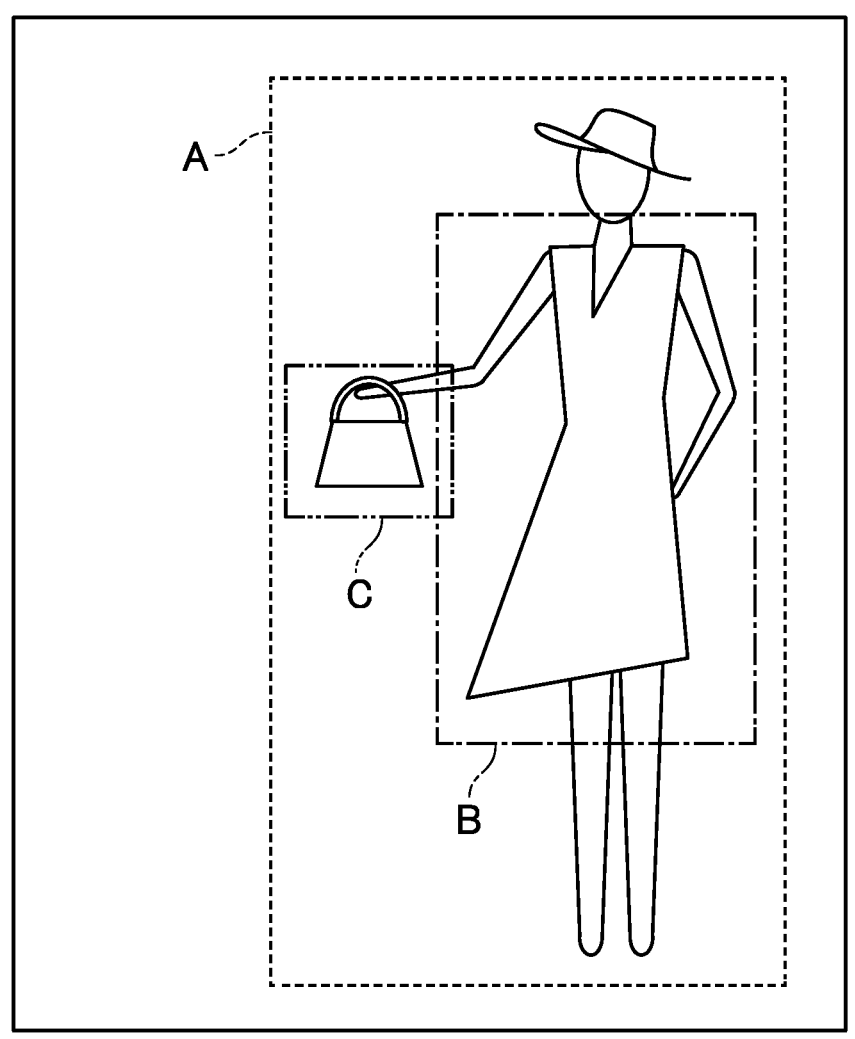
FIG. 3 is a view of an example of various "principal portions" of the input image.

This is because a "principal portion" of a certain input image can vary in accordance with how the input image is used. Specifically, when, for an input image of FIG. 3, which is the same as the input image of FIG. 2, a human image is required as the "principal portion," a region which is within a frame indicated by broken lines A of FIG. 3 and from which unnecessary margins are removed is considered as appropriate. However, when clothes and accessories (or fashion) are required as the "principal portion," a region which is within a frame indicated by one-dot chain lines B of FIG. 3 is appropriate as the "principal portion." When a bag is required as the "principal portion," a region which is within a frame indicated by two-dot chain lines C of FIG. 3 is appropriate.

Thus, it is required to define the "principal portion" of the input image based on information indicating how the input image is used. This information is provided by a certain method independently of the input image. This information is hereinafter referred to as "attribute" of the input image. In the case of FIG. 3, all of "human image," "clothes and accessories," and "bag" are a specific example of the attribute.

Incidentally, in the technical field of the image analysis, it is already known that it is possible to create an evaluation image numerically indicating evaluation in terms of importance of, as a unit, each pixel forming an image by preparing appropriate learning data. In the present application, this evaluation image is hereinafter referred to as "heatmap." A resolution of the heatmap is not always required to match that of the input image. An individual evaluation value may be indicated for a plurality of pixels, such as 3×3 pixels or 5×5 pixels.

However, a perspective (that is, attribute) based on which this heatmap is generated depends on the prepared learning data for the machine learning. Thus, even when a region indicated by the heatmap is extracted as the principal portion, it is impossible to indicate an appropriate principal portion each time in accordance with various perspectives only through use of a known technology.

Meanwhile, it is theoretically possible to obtain a "principal portion" corresponding to a perspective by preparing machine learning models each of which is individually caused to learn for a relevant perspective. However, this method requires to exhaustively prepare a large number of pieces of learning data formed of sets of a large number of images and correct-answer images indicating "principal portions" of the images for each perspective, to thereby train the machine learning model. Thus, it is theoretically possible to obtain the "principal portion" for each perspective by this method, but the preparation of the learning data for each perspective is difficult, and this method is not therefore practical.

In view of the above, in the information-processing device 100 according to the present invention, the image evaluation module 110 can be built from machine learning models implemented through use of learning data which can relatively easily be acquired.

Figure 4:
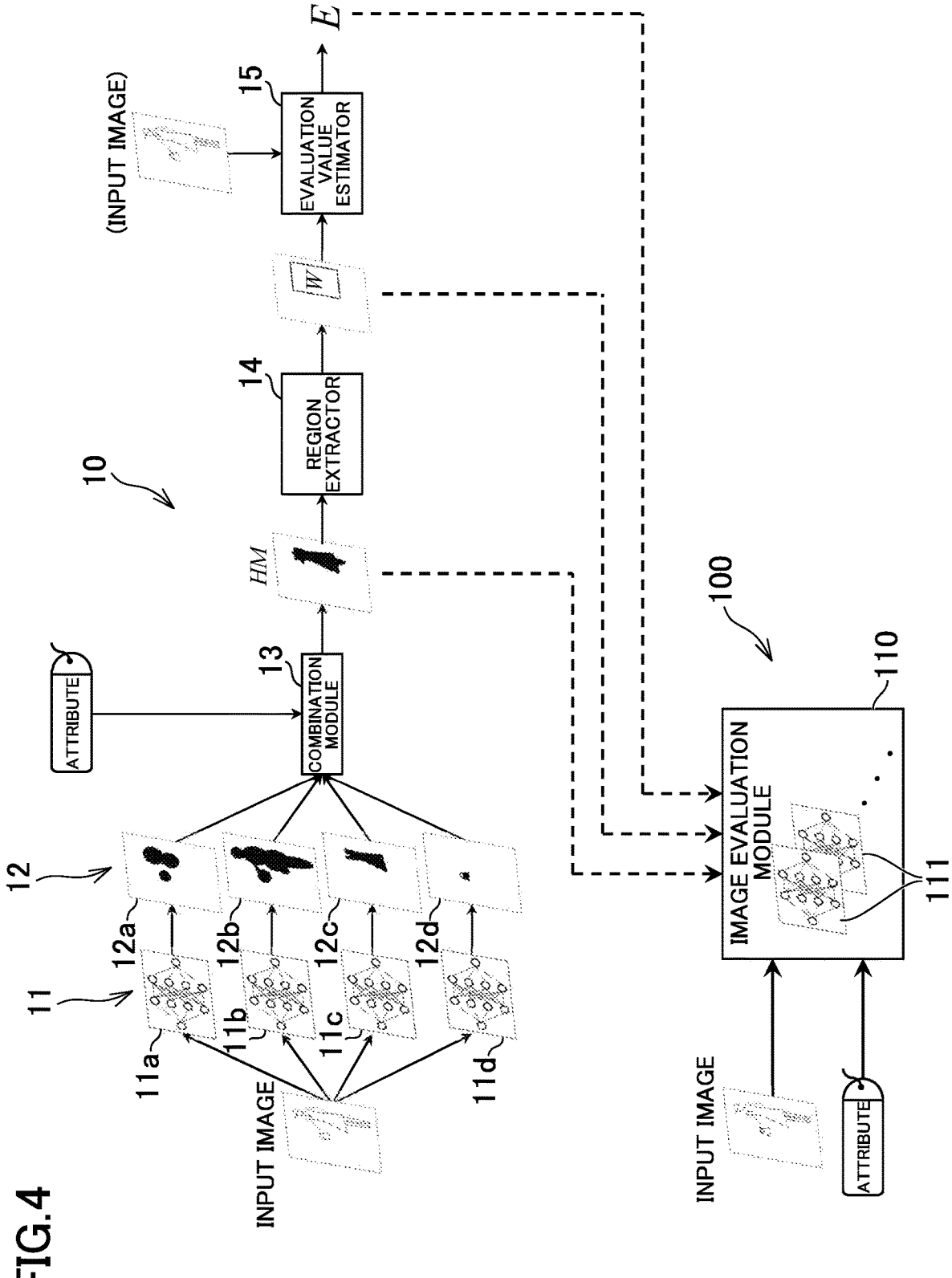
FIG. 4 is a schematic diagram for illustrating a method of causing machine learning models included in an image evaluation module of the information-processing device to learn.

FIG. 4 is a schematic diagram for illustrating a method of causing machine learning models 111 included in the image evaluation module 110 of the information-processing device 100 to learn. The information-processing device 100 is illustrated in the lower side of FIG. 4. In this configuration, the machine learning models 111 included in the image evaluation module 110 are before or during the learning.

Meanwhile, in FIG. 4, a machine learning pipeline 10 is illustrated the upper side of the information-processing device 100. The machine learning pipeline 10 receives input of an input image and an attribute, and uses a group of machine learning models 11, which are existing or can easily be built, to output at least any one of a heatmap HM indicating a principal portion of the input image, a region W corresponding to the principal portion, and an estimation value of an evaluation value E corresponding to this region W. That is, when the machine learning pipeline 10 is used, there is obtained learning data including, as a question, the input image and the attribute and including, as an answer, at least any one of the heatmap HM, the region W, and the evaluation value E. It is thus possible to use this learning data to cause the machine learning models 111 included in the image evaluation module 110 to learn, to thereby realistically build the image evaluation module 110 which receives the input image and the attribute as input, and outputs the region W and the evaluation value E.

Which of the heatmap HM, the region W, and the evaluation value E is used as the learning data for the machine learning models 111 depends on a configuration of the image evaluation module 110. Each of various specific configuration examples of the image evaluation module 110, and a learning method for the machine learning models 111 in this configuration are described later.

Moreover, the method of causing the machine learning models 111 of FIG. 4 to learn is an application of a learning method known as the knowledge distillation or the teacher-student model in the technical field of the machine learning. That is, the machine learning models 111 included in the image evaluation module 110 are obtained by distilling knowledge implemented by the machine learning pipeline 10. When the machine learning models 111 are considered as a machine learner, the knowledge included in the machine learning pipeline is efficiently stored in a more compact model (that is, having a smaller number of nodes or a smaller number of calculations required for inference). Thus, in terms of such a point that the region W and the evaluation value E corresponding to the attribute are output for the input image, the machine learning pipeline 10 and the information-processing device 100 provide results equivalent to each other. However, in terms of execution on a computer, there are such merits that a calculation load required for the inference is lower, and an inference speed is higher in the information-processing device 100.

A specific configuration of the machine learning pipeline 10 is now described. In the machine learning pipeline 10, the plurality of machine learning models which are existing or can easily be built are prepared as the machine learning models 11 as described above. In FIG. 4, four machine learning models 11a to 11d are illustrated as an example, but this number may be any number. It is only required to prepare a required number of machine learning models in accordance with the number of attributes to be used.

The machine learning models 11a to 11d output not a heatmap which indicates the principal portion of the image and can vary in accordance with the attribute of the input image, but a heatmap based on a specific perspective defined for each of the machine learning models 11a to 11d. In the present application, the heatmap which indicates the principal portion of the image and corresponds to the attribute of the input image is hereinafter simply referred to as "heatmap HM," and the heatmap which is based on a single perspective and is obtained by the individual machine learning models 11a to 11d is referred to as "intermediate heatmap 12." Both of those heatmaps are thus distinguished from each other. The intermediate heatmap corresponds to, for example, output of an attention map or an attention image generated through use of an attention model included in an individual machine learning model. In this case, the machine learning model uses the attention model to generate the output of, for example, the attention map or the attention image as the intermediate heatmap based on a feature amount map output from a feature extractor such as a convolutional neural network (CNN) included in this machine learning model. The attention map may be a map generated based on the attention model, or may be a map generated without being based on the attention model. For example, an attention map as an intermediate heatmap in CTR prediction or aesthetic value prediction corresponds to an attention map generated based on the attention model.

FIG. 5 to FIG. 8 are examples of the intermediate heatmap 12 for the input image exemplified in FIG. 2.

Figure 5:
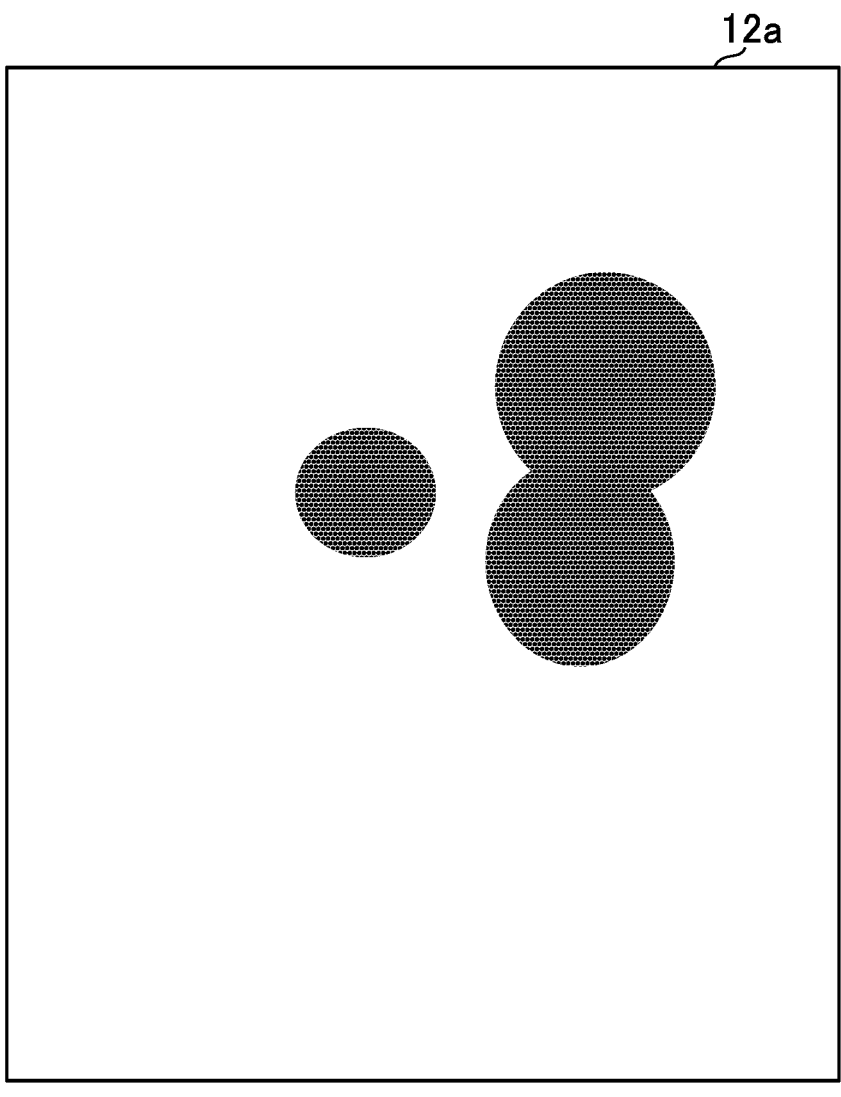
FIG. 5 is a view of an intermediate heatmap indicating CTR prediction.

An intermediate heatmap 12a of FIG. 5 indicates the click through rate (CTR) prediction. The machine learning model 11a which outputs the CTR prediction as the intermediate heatmap 12a can be obtained by being trained through use of, for example, the architecture of the machine learning known as CNN and an image annotated using scores corresponding to the CTR as the learning data. This learning data can be acquired by, for example, tracking a user operation on an image displayed on an electronic commerce (EC) website.

Figure 6:
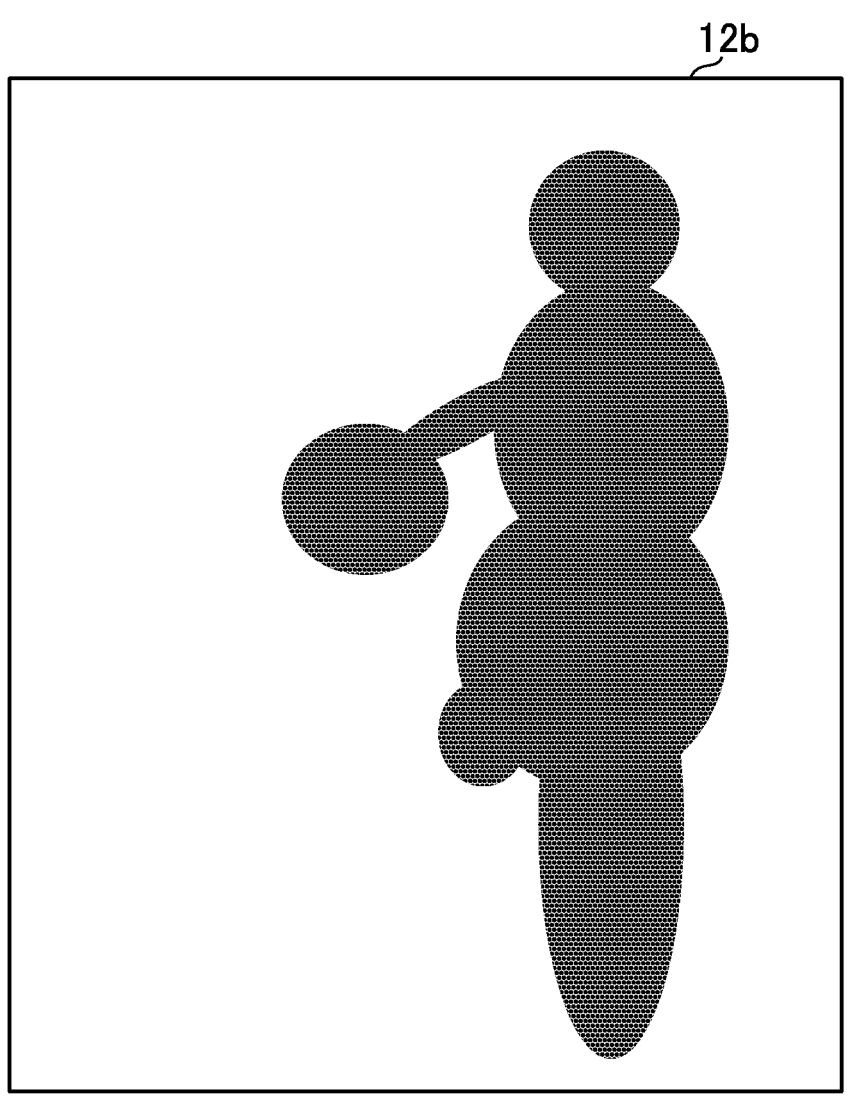
FIG. 6 is a view of an intermediate heatmap indicating an aesthetic value.

An intermediate heatmap 12b of FIG. 6 indicates the aesthetic value. As learning data for obtaining a machine learning model 11b which outputs the aesthetic value as the intermediate heatmap 12b, learning data disclosed on the Internet for free or for a fee already exists for research purpose and practical applications. This learning data can accordingly be used to train the machine learning model 111, for example, a CNN to obtain the machine learning model 11b. In general, in this learning data, the learning is executed by giving, as the aesthetic value, a high evaluation to a portion which is likely to attract attention of a viewer in an image, and giving a low evaluation to a portion which is less likely to attract the attention of the viewer without specifically restricting an application and the like. The aesthetic value as used herein can be expressed as "aesthetic score."

Figure 7:
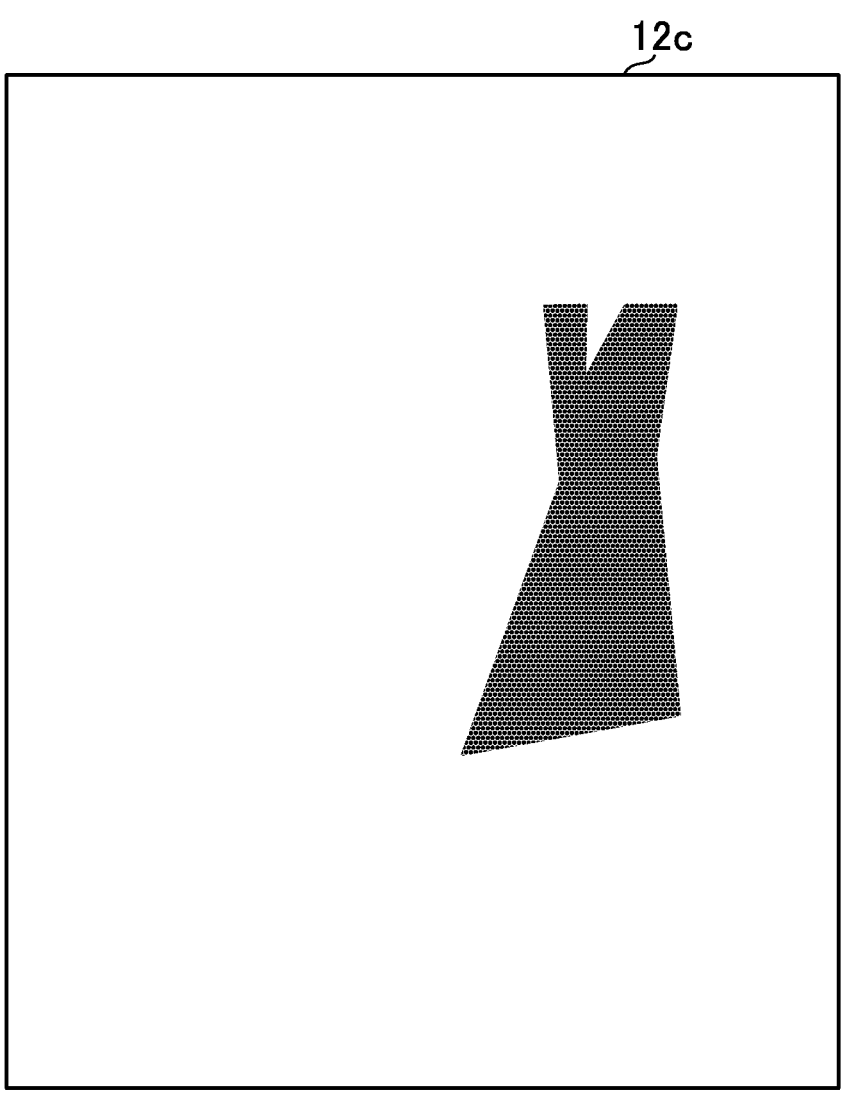
FIG. 7 is a view of an intermediate heatmap indicating clothes and accessories.

An intermediate heatmap 12c of FIG. 7 indicates clothes and accessories. That is, this intermediate heatmap 12c is an image indicating a portion corresponding to "clothes and accessories" in the image, and indicates a region in which clothes worn by a person in the input image appear. In order to obtain the machine learning model 11c which outputs this intermediate heatmap 12c, dedicated learning data may be created exhaustively. However, as a simpler way, for example, regions of any image are extracted and labeled through use of the segmentation technology for image, and data on regions labeled as "clothes" are used as the learning data, to thereby train the machine learning model 11c. As this segmentation technology for image, technologies known as R-CNN and Faster R-CNN are famous, and such technologies may be used. As another example, the R-CNN or the Faster R-CNN may directly be used as the machine learning model 11c to extract only the data on the regions labeled as "clothes," and the extracted data may be used as the intermediate heatmap 12c.

Figure 8:
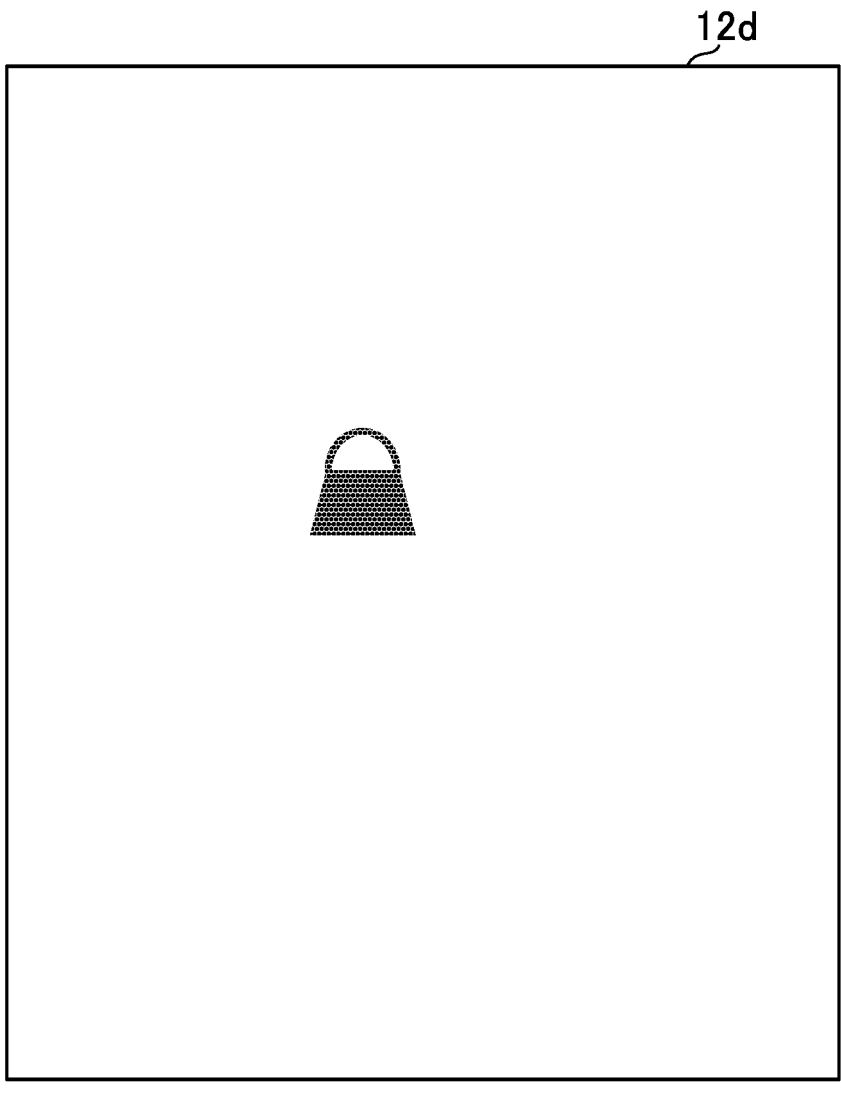
FIG. 8 is a view of an example of an intermediate heatmap indicating a bag.

An intermediate heatmap 12d of FIG. 8 indicates a bag, which means that this intermediate heatmap 12d indicates a region of the input image in which the bag appears. In order to obtain the machine learning model 11d which outputs this intermediate heatmap 12d, processing equivalent to that described for the clothes of FIG. 7 is only required to be performed for the bag.

Similarly, any required number of types of machine learning models 11 are prepared, to thereby obtain intermediate heatmaps 12 of the required number of types. In the examples of the intermediate heatmaps 12a to 12d of FIG. 5 to FIG. 8, the intermediate heatmaps 12a to 12d are indicated as binary images for the convenience of illustration. However, the heatmaps are not limited to those examples, and may be grayscale images having any number of bits.

Moreover, the machine learning models 11a to 11d are described to use the CNN in the above-mentioned example. However, the architecture of the machine learning model is not limited to this example. The architecture may use not only the DNN such as the CNN, but also another machine learning method. The architectures of intermediate heatmap 12 to be obtained, that is, the architectures of the machine learning models 11 may be different from each other. Moreover, the format of the input image is converted in accordance with the machine learning model 11 to which the input image is to be input. For example, the input image is converted to a raster image having a predetermined size and a predetermined resolution.

The plurality of obtained intermediate heatmaps 12 are combined into one heatmap HM by a combination module 13. When this combination is executed, the attribute is reflected, and the obtained heatmap HM corresponds to this attribute.

Figure 9:
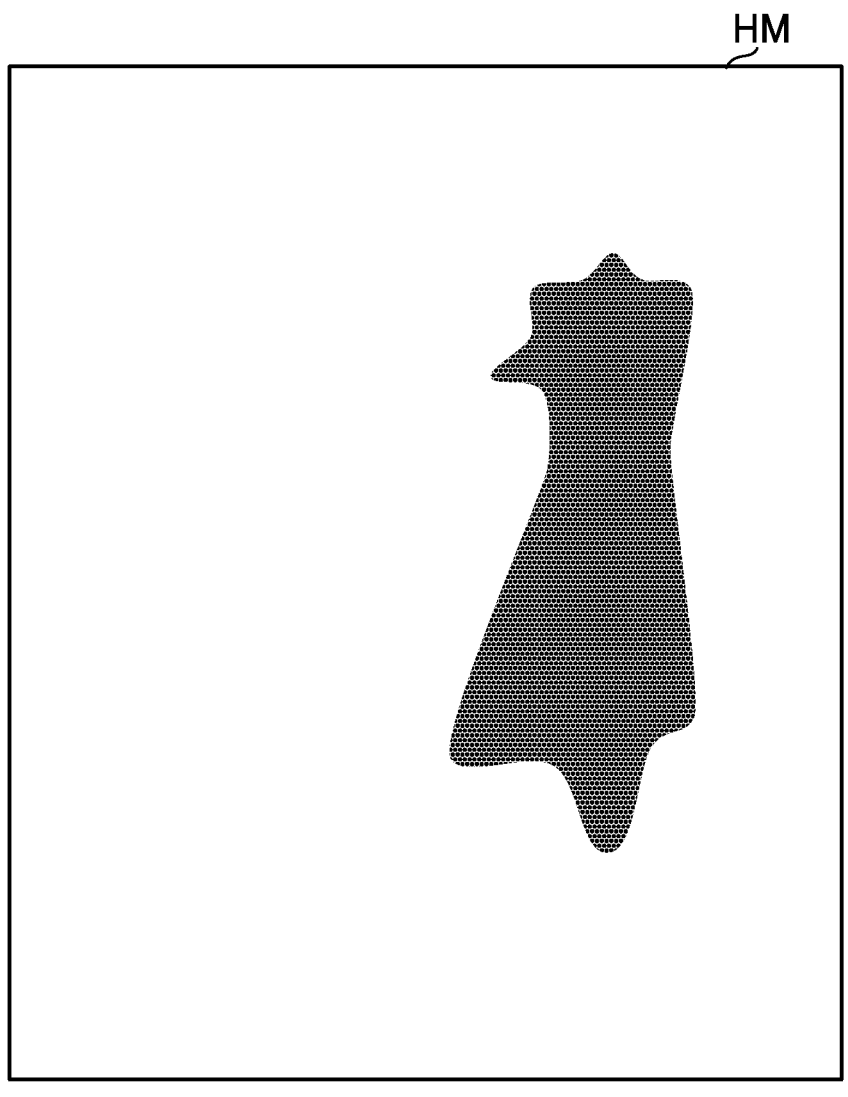
FIG. 9 is a view of an example of a generated heatmap.
Figure 10:
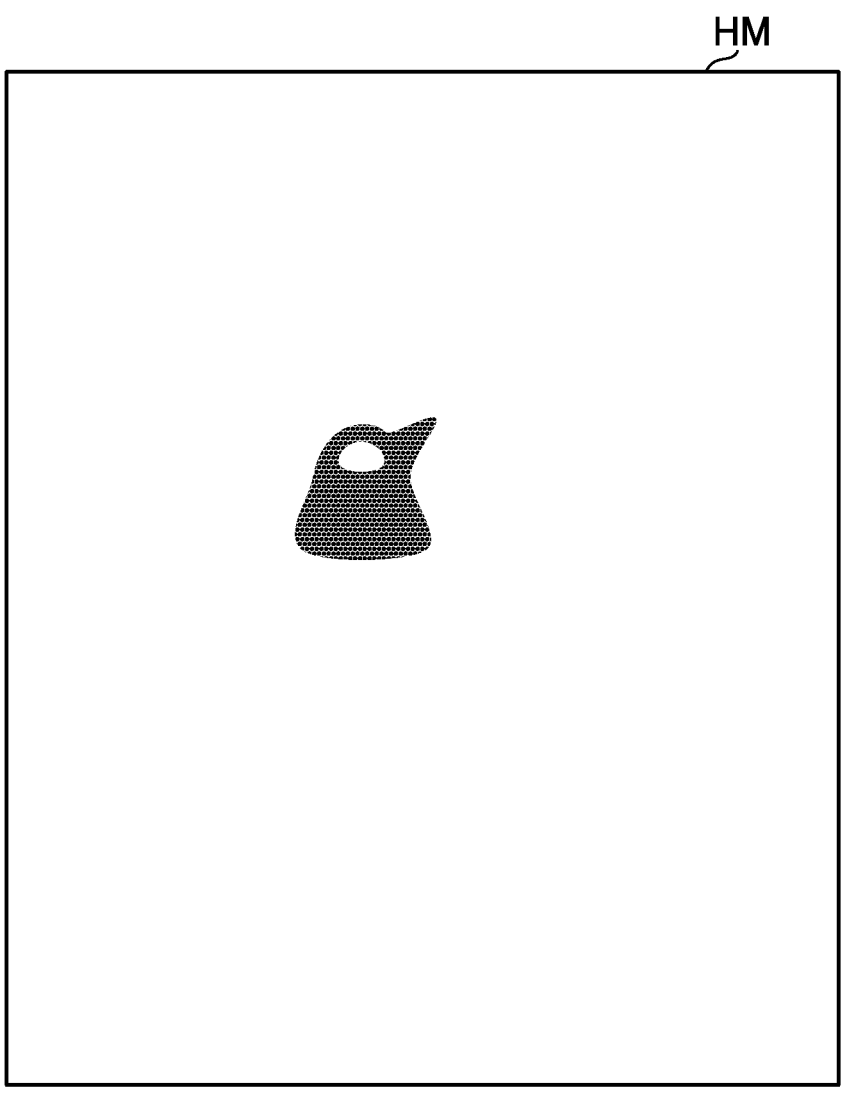
FIG. 10 is a view of an example of the generated heatmap.

FIG. 9 and FIG. 10 are views of examples of the heatmaps HM generated by the combination module 13. The heatmap HM of FIG. 9 is generated when the clothes are specified as the attribute. The heatmap HM of FIG. 10 is generated when the bag is specified as the attribute. Both of the heatmaps HM are generated based on the input image of FIG. 2, and it is understood that the heatmaps HM completely different from each other are generated when the specified attributes are different from each other. Meanwhile, for example, when the heatmap of FIG. 9 and the intermediate heatmap indicating the clothes of FIG. 7 are compared with each other, both thereof are not the same. That is, a region in which only the clothes appear is indicated in the intermediate heatmap of FIG. 7, while a region which is centered around the portion of the clothes and also includes a moderate region therearound is indicated in the heatmap of FIG. 9. It is thus understood that when the input image is used as an image indicating the cloth, the appropriate region is selected as a region indicating a principal portion of this image. Also in the heatmap of FIG. 10, it is understood that a region considered as appropriate is similarly selected appropriately.

As the combination method capable of obtaining those heatmaps HM, the combination module 13 combines the intermediate heatmaps 12 based on, for example, weights corresponding to a specified attribute. For example, when description is given of the example of FIG. 4, weight coefficients by which the respective intermediate heatmaps 12 are multiplied when the intermediate heatmaps 12a to 12d are combined are represented as (a, b, c, d), respectively, and the weight coefficients when the clothes are specified as the attribute are set as (0.3, 0.3, 0.4, 0). With this setting, the combination module 13 outputs the heatmap HM of FIG. 9 in which a region relating to the clothes is more highly evaluated while the CTR and the aesthetic value are considered. In contrast, when the bag is specified as the attribute, and (0.3, 0.3, 0, 0.4) are set the weight coefficients, the combination module 13, for this time, outputs the heatmap HM of FIG. 10 in which a region relating to the bag is more highly evaluated while the CTR and the aesthetic value are considered.

The above description is given of the example in which, as the processing performed by the combination module 13, the intermediate heatmaps 12a to 12d are combined based on the weights corresponding to the attribute, but another method may be used as long as the heatmap HM corresponding to the attribute can be obtained through the combination based on the intermediate heatmaps 12. As such a method, there may be used, for example, a method of selecting, in advance, machine learning models 11 into which the input image is input in accordance with the attribute, and combining the intermediate heatmaps 12 output from the selected machine learning models 11 to obtain the heatmap HM, a method of selecting, in accordance with the attribute, intermediate heatmaps 12 to be input to the combination module 13 from the intermediate heatmaps 12 output from the machine learning models 11, and combining the selected intermediate heatmaps 12 to obtain the heatmap HM, a method of a combination of those methods, and the like.

A region extractor 14 identifies the region W corresponding to the principal portion being a portion of the input image based on the heatmap HM obtained through the combination by the combination module 13. In examples of the present application, the shape of the region W is rectangular, but the shape of the principal portion may be any shape such as an ellipsoid, a star shape, and another irregular shape.

Figure 11:
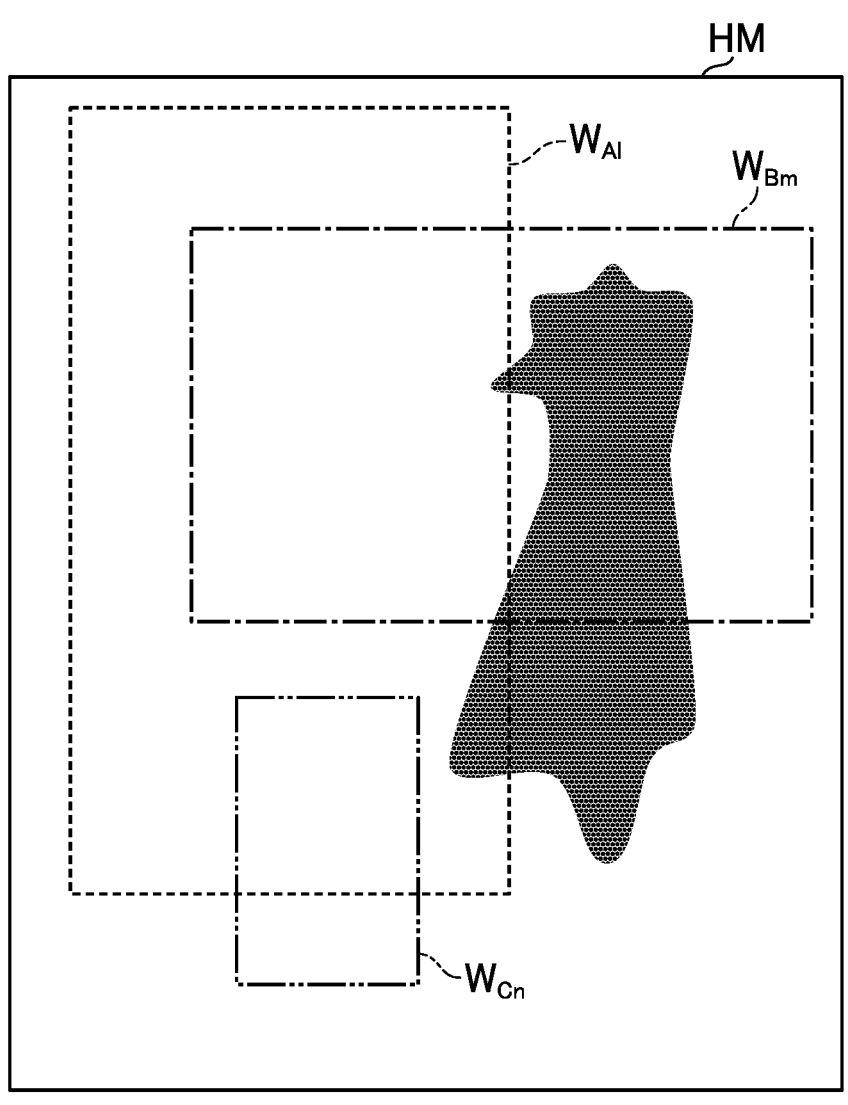
FIG. 11 is a view for illustrating an example of processing executed in a region extractor.

FIG. 11 is a view for illustrating an example of the processing executed by the region extractor 14. A method described now uses a method called "sliding window." First, the region extractor 14 sets, to the heatmap HM, various cutout windows X different in size and shape. For example, all of $X_{Al}$, $X_{Bm}$, and $X_{Cn}$ of FIG. 11 are one of the cutout windows X. In this notation, each of first suffixes (A, B, C, . . . ) of X indicates the size and the shape of the cutout window X, and each of second suffixes (l, m, n, . . . ) indicates the position of the cutout window X on the heatmap HM.

That is, for example, "l" cutout windows X, for example, the cutout windows $X_A$, which have a certain size and shape and are shifted in position are set as $X_{Al}$, . . . , $X_{Al}$ so that the entire region on the heatmap HM is covered. Similarly, "m" cutout windows $X_B$ and "n" cutout windows $X_C$ are set. Only the three types being $X_A$ to $X_C$ are described as the sizes and the shapes of the cutout window X for the convenience of description, but, in a case of region of a larger number of types in size and shape, those cutout windows are also similarly set.

Of the cutout windows X set in this way, windows X which satisfy the following condition are extracted as candidate windows $X_{cand}$.

$$X_{cand} = \left\{ W \mid \sum\nolimits_{x \in X} P(x) > \lambda \sum\nolimits_x P(x) \right\} \qquad \text{[Expression 1]}$$

In Expression (1), "x" is a pixel included in the heatmap HM, P(x) is a value of the heatmap HM at the pixel "x", and $\lambda$ is any threshold value, and satisfies $0 < \lambda < 1$. That is, Expression 1 consequently expresses that a cutout window X having a ratio of a sum of the values of pixels "x" included in the cutout window X to a sum of the values of all of the pixels "x" of the heatmap HM larger than $\lambda$ is extracted as the candidate window $X_{cand}$. The value of $\lambda$ may be given as any fixed value, for example, 0.7, or there may be provided such setting that any ratio, for example, 5% of top cutout windows X in terms of the ratio of the sum are extracted as candidate windows $X_{cand}$ from all of the regions W.

After that, from the candidate windows $X_{cand}$, a candidate window $X_{cand}$ appropriate as a region W is selected. As an example, a method given by Expression 2 may be used.

$$W = \underset{x \in X_{cand}}{\operatorname{argmin}} |X| \qquad \text{[Expression 2]}$$

Figure 12:
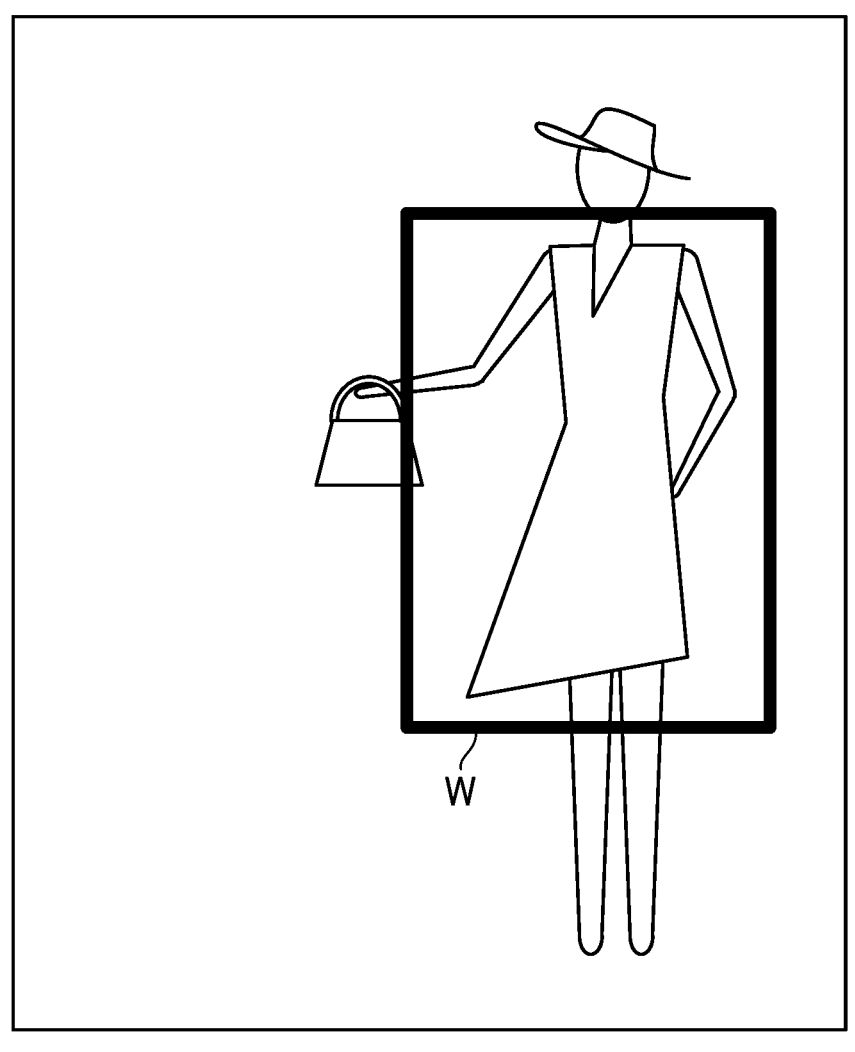
FIG. 12 is a view for illustrating an example of an obtained region.

In Expression 2, |X| indicates the number of pixels included in the cutout window X, and Expression 2 consequently expresses that a cutout window X having the smallest size is selected out of the cutout windows X included in the candidate regions $X_{cand}$. In the manner described above, the region W is finally obtained as illustrated in, for example, FIG. 12.

The method of selecting a portion appropriate as the region W from the cutout windows X included in the candidate regions $X_{cand}$ is not limited to the above-mentioned method. For example, the machine learning model 11b which outputs the aesthetic value described with reference to FIG. 4 may be used to select a cutout window X which includes the highest aesthetic value out of the cutout windows X included in the candidate regions $X_{cand}$ as given by Expression 3.

$$W = \underset{x \in X_{cand}}{\operatorname{argmax}} Q(X) \qquad \text{[Expression 3]}$$

In Expression (3), Q(X) indicates the aesthetic value in the intermediate heatmap relating to the aesthetic value. That is, Expression 3 expresses that a cutout window X which has the largest total of the aesthetic values of pixels is selected from the cutout windows X included in the candidate regions $X_{cand}$. In this embodiment, a certain score based on a total of one or a plurality of scores for the cutout window X may be treated as the aesthetic value in Expression 3.

Figure 13:
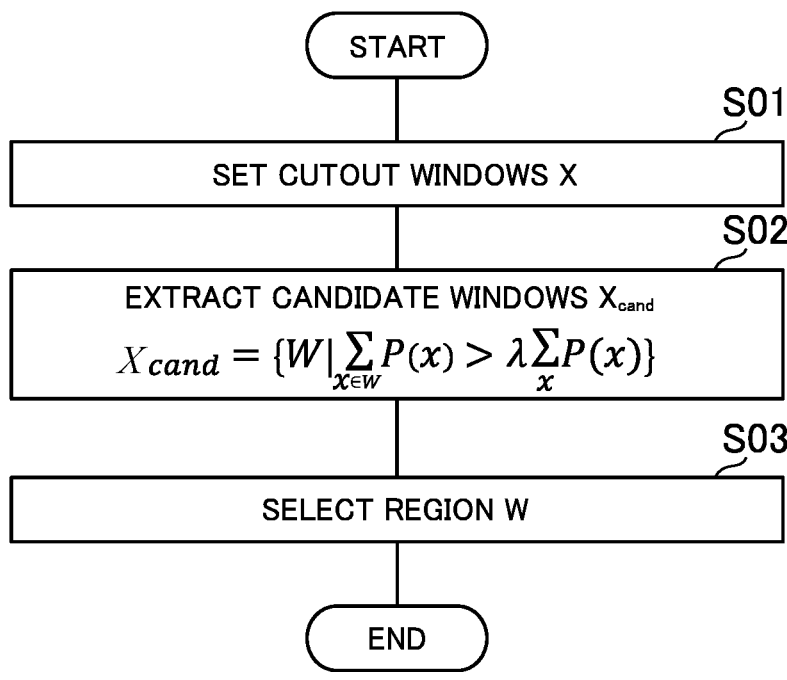
FIG. 13 is a flowchart for illustrating a processing flow executed in the region extractor.

FIG. 13 is a flowchart for illustrating a processing flow executed by the region extractor 14 in the above-mentioned examples. When the region extractor 14 starts the processing, the region extractor 14 sets the cutout windows X having various sizes, shapes, and positions as described above in Step S01, and extracts candidate windows $X_{cand}$ by the method given by Expression 1 or another similar method in Step S02. After that, in Step S03, the region extractor 14 selects a candidate window $X_{cand}$ appropriate as the region W by the method given by Expression 2 or Expression 3, or another method.

As another example, the region extractor 14 may execute other processing to obtain the region W. As an example, a machine learning model, preferably a learned R-CNN may be used to directly output the size, the shape, and the position of the region W from the heatmap. In order to obtain this machine learning model, it is only required to execute training through use of learning data indicating various examples of a heatmap and corresponding regions W. In order to obtain this learning data, the method called "sliding window" described as the processing executed by the region extractor 14 may be used.

Figure 14:
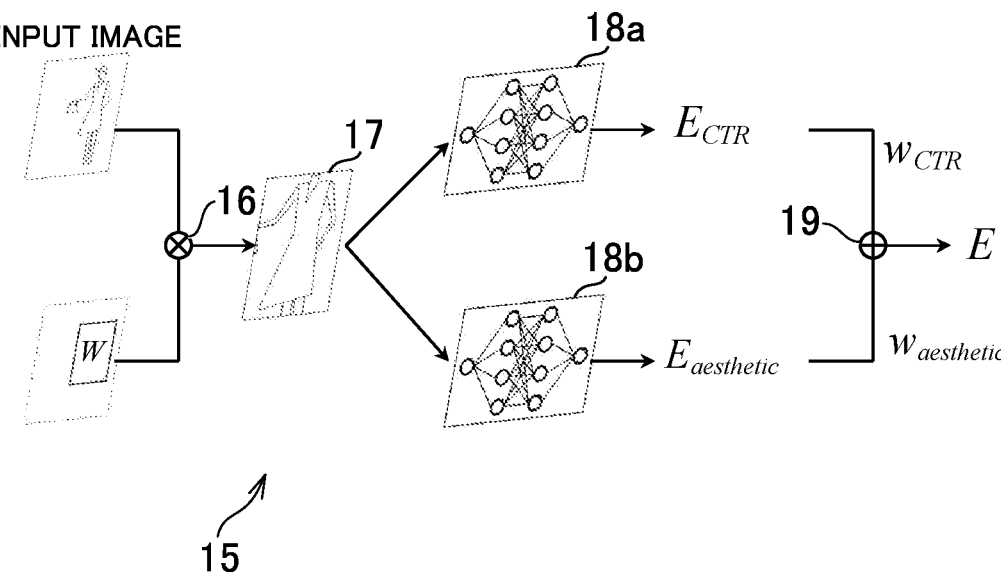
FIG. 14 is a diagram for illustrating an example of a configuration of an evaluation value estimator.

Referring back to FIG. 4, the evaluation value E in the region W obtained by the region extractor 14 is estimated by an evaluation value estimator 15. FIG. 14 is a diagram for illustrating an example of a configuration of the evaluation value estimator 15.

The evaluation value estimator 15 evaluates an image formed of only a portion of the input image corresponding to the region W. For this purpose, first, the input image and the region W are multiplied by each other by a multiplier 16, to thereby obtain a region image 17. After that, it is only required to make predetermined evaluation for the region image 17. In this example, as an evaluation criterion therefor, the above-mentioned CTR and aesthetic value are used.

That is, the evaluation value estimator 15 includes two models of a machine learning model 18a and a machine learning model 18b. The machine learning model 18a outputs, for input of an image, $E_{CTR}$ being a CTR of the image. Similarly, the machine learning model 18b outputs, for input of an image, $E_{aesthetic}$ being an aesthetic value of the input image. Any one of the machine learning model 18a and the machine learning model 18b may be a DNN such as a CNN. Moreover, the learning data therefor is relatively easily obtained as described above, and hence building of those machine learning models 18a and 18b is fully possible.

The machine learning model 18a and the machine learning model 18b are different from the machine learning model 11a and the machine learning model 11b described above with reference to FIG. 4. That is, the machine learning model 18a and the machine learning model 18b do not output the intermediate heatmaps 12, but are caused to learn to directly output evaluation values $E_{CTR}$ and $E_{aesthetic}$. However, in place of those machine learning models 18a and 18b, the same machine learning models 11a and 11b as those of FIG. 4 may be used, and the evaluation values $E_{CTR}$ and $E_{aesthetic}$ may be calculated from intermediate heatmaps output therefrom (for example, an average value of evaluation values of pixels included in the intermediate heatmaps is used as the evaluation value of the image itself).

The obtained evaluation values $E_{CTR}$ and $E_{aesthetic}$ are added by an adder 19, to thereby obtain the final evaluation value E. In this case, appropriate weights $w_{CTR}$ and $w_{aesthetic}$ are multiplied as given by Expression 4, to thereby adjust magnitudes of influence of the CTR and the aesthetic value applied to the evaluation value E.

$$E = w_{CTR}E_{CTR} + w_{aesthetic}E_{aesthetic} \qquad \text{[Expression 4]}$$

The above-mentioned sum of $E_{CTR}$ and $E_{aesthetic}$ as the evaluation value E used in the evaluation value estimator 15 is an example of the evaluation value E. Any one of $E_{CTR}$ and $E_{aesthetic}$ may directly be used as the evaluation value E, or another value may be used as the evaluation value E. Moreover, the evaluation value E is not always required to be a single value, and both of $E_{CTR}$ and $E_{aesthetic}$ may be used or another value may be used in place thereof or in addition thereto. In this case, the evaluation value E is conceptualized as not a scalar value, but a vector value.

The heatmap HM, the region W, and the evaluation value E are obtained for the input image and the attribute from the above-mentioned machine learning pipeline 10, and hence the heatmap HM, the region W, and the evaluation value E can be used as the learning data to cause the machine learning models 111 included in the image evaluation module 110 of the information-processing device 100 to learn.

Description is now given of various embodiments of a specific configuration of the information-processing device 100 which is caused to learn through use of the learning data acquired from the machine learning pipeline 10.

Figure 15:
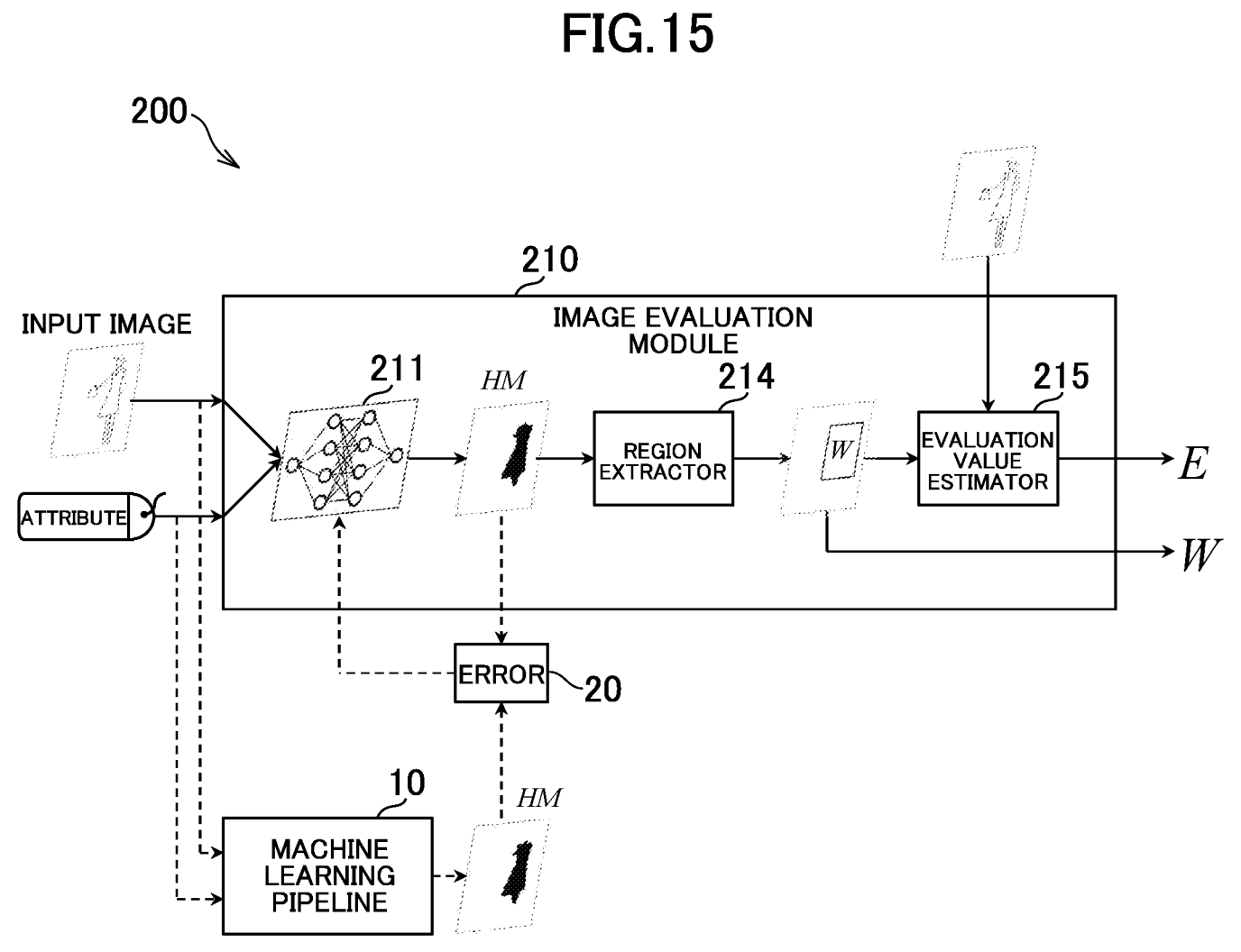

FIG. 15 is a diagram for illustrating a configuration of an information-processing device 200 according to a first embodiment of the present invention together with an operation during the learning of a machine learning model 211.

To an image evaluation module 210 of the information-processing device 200, the machine learning model 211, a region extractor 214, and an evaluation value predictor 215 are connected. The image evaluation module 210, as a whole, forms a pipeline of information processors.

The machine learning model 211 is a heatmap output model which is caused to learn so that, for input of an input image and an attribute, a heatmap HM corresponding to the attribute is output. Thus, when, for example, the input image exemplified in FIG. 2 is input to the machine learning model 211 and the attribute "clothes" is input thereto, this model outputs the heatmap HM of FIG. 9 corresponding to the attribute being the clothes. When the attribute "bag" is input for the same input image, the machine learning model 211 outputs the heatmap HM of FIG. 10 corresponding the attribute being the bag.

As described above, when the input image and the attribute are given to the machine learning model 211, the heatmap HM corresponding to the attribute is directly obtained. This heatmap HM is input to the region extractor 214, to thereby be able to obtain the region W. The region W is further input to the evaluation value estimator 215, to thereby be able to obtain the evaluation value E. That is, for a common input image, a heatmap HM output when one attribute is given and a heatmap HM output when another attribute different from the one attribute is given are different from each other. Thus, it should be understood that, in the information-processing device 200, for the common input image, the region W and the evaluation value E output when the one attribute is given and the region W and the evaluation value E output when the another attribute different from the one attribute is given are different from each other.

The region extractor 214 and the evaluation value estimator 215 of the information-processing device 200 may be the same as the region extractor 14 and the evaluation value estimator 15 described in the case of the machine learning pipeline 10 of FIG. 4. Thus, a detailed description thereof is not redundantly given.

With continued reference to FIG. 15, description is given of a method of obtaining the machine learning model 211, that is, causing the machine learning model 211 to learn. In FIG. 15, the operation of the machine learning model 211 during the learning is clarified by indicating this operation as broken lines.

The machine learning model 211 outputs the heatmap HM for the input of the input image and the attribute as described above. The machine learning pipeline 10 of FIG. 4 (also illustrated in FIG. 15) can also output the heatmap HM for the input of the input image and the attribute, which is also described above.

Thus, for the input of the same input image and attribute, the heatmap HM obtained from the machine learning pipeline 10 is considered as a correct-answer image, and the heatmap HM obtained from the machine learning model 211 is considered as a prediction image. An error 20 therebetween is then obtained. The error 20 may be any error generally used in the technology of machine learning, such as the cross entropy error or the least square error. After that, an appropriate method such as the backpropagation is used to update an internal state of the machine learning model 211.

The learning of the machine learning model 211 is executed by appropriately repeating this procedure a required number of times. The output of the heatmap HM as the correct-answer image by the machine learning pipeline 10 and the output of the heatmap HM as the prediction image from the machine learning model 211 is not required to be executed simultaneously in parallel. The output of the heatmap HM by the machine learning pipeline 10 may be executed in advance for the prepared input images and attributes, to thereby create a set of the learning data. After that, this learning data may be used to execute the learning of the machine learning model 211.

As already described in the case of the machine learning pipeline 10, the heatmap HM is obtained by combining, in accordance with the attribute, the plurality of intermediate heatmaps 12 obtained from the plurality of learned machine learning models 11 which are different from each other, and generate the intermediate heatmaps 12 for the input of the input image. Thus, the machine learning model 211 is obtained by the learning method of learning through use of teacher data including the input image and the attribute as a question, and this heatmap HM obtained by the machine learning pipeline 10 as an answer.

Figure 16:
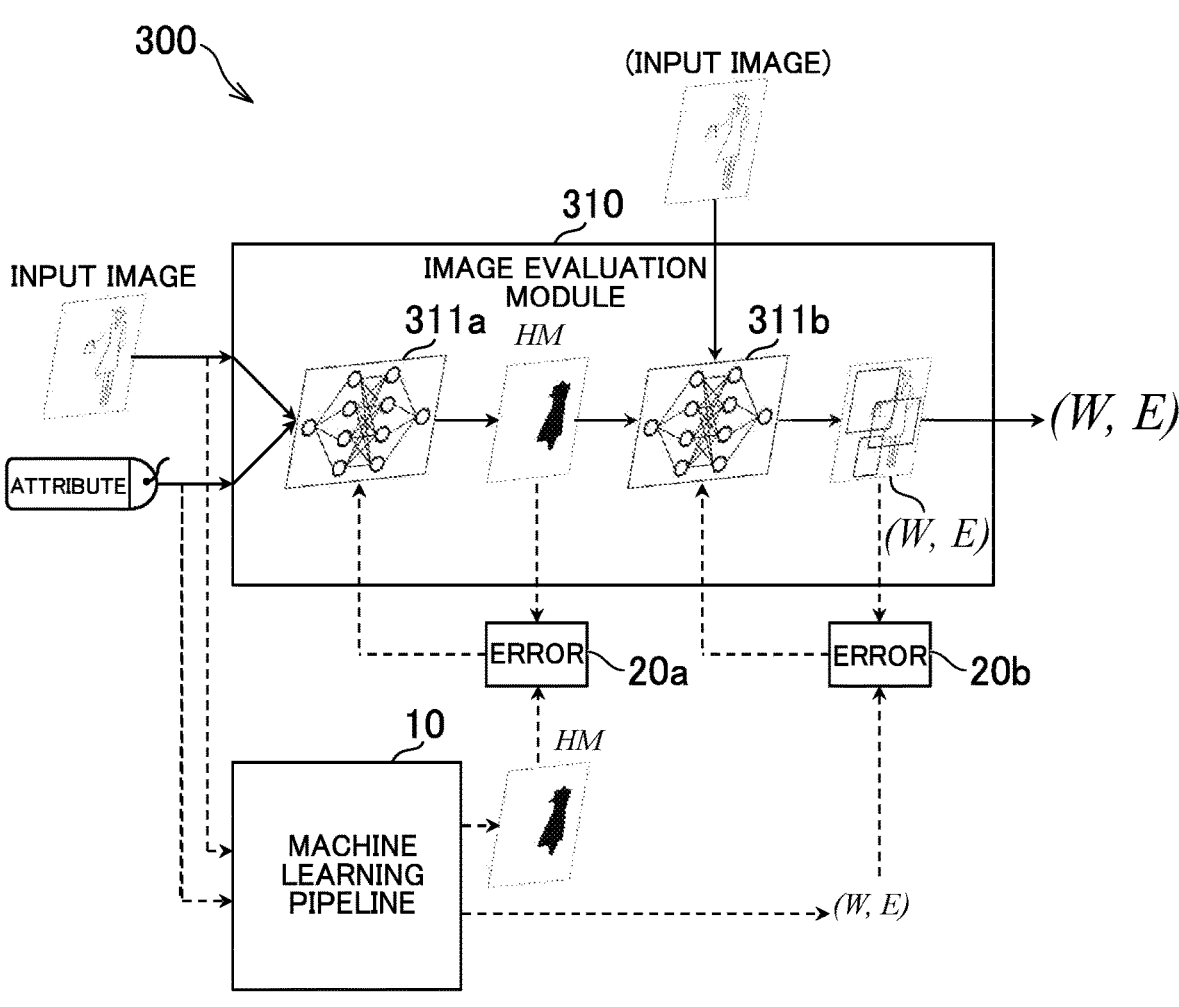
FIG. 16 is a diagram for illustrating a configuration of the information-processing device according to a second embodiment of the present invention together with an operation at the time when machine learning models are caused to learn.

FIG. 16 is a diagram for illustrating a configuration of an information-processing device 300 according to a second embodiment of the present invention together with an operation during the learning of machine learning models 311a and 311b.

An image evaluation module 310 of the information-processing device 300 includes the machine learning model 311a and the machine learning model 311b. The image evaluation module 310 is, as a whole, a type of pipeline for the machine learning formed by connecting the machine learning model 311a and the machine learning model 311b to each other.

The machine learning model 311a is the same as the machine learning model 211 of the information-processing device 200 according to the first embodiment, and is a heatmap output model caused to learn so that, for the input of the input image and the attribute, the heatmap HM corresponding to the attribute is output. Thus, the description of the information-processing device 200 according to the first embodiment described above is incorporated for a redundant description of the machine learning model 311a, and the redundant description is omitted.

The heatmap HM obtained from the machine learning model 311a is input into the machine learning model 311b. The machine learning model 311b is provided in place of the region extractor 214 and the evaluation value estimator 215 of the information-processing device 200 according to the first embodiment described above, and is a region evaluation value output model which is caused to learn so that the machine learning model 311b inputs the heatmap HM and the input image, and outputs a set (W, E) of the region W and the evaluation value E.

Also in the image evaluation module 310 having this configuration, when the input image and the attribute are given to the machine learning model 311a, the heatmap HM corresponding to the attribute is directly obtained. The set (W, E) of the region and the evaluation value is obtained by further giving the heatmap HM to the machine learning model 311b. It should be understood that, for a common input image, the set of the region and the evaluation value (W, E) output when one attribute is given and the set of the region and the evaluation value (W, E) output when another attribute different from the one attribute is given are different from each other.

With continued reference to FIG. 15, description is given of a method of obtaining the machine learning models 311a and 311b, that is, causing the machine learning models 311a and 311b to learn. Also in FIG. 16, the operation of the machine learning models 311a and 311b during the learning is clarified by indicating this operation as broken lines.

Description of the learning of the machine learning model 311a is the same as that of the information-processing device 200 according to the first embodiment described above. Thus, the description of the information-processing device 200 according to the first embodiment is also incorporated for a redundant description of the learning of the machine learning model 311a, and the redundant description is omitted. The error 20 of FIG. 15 corresponds to an error 20a of FIG. 16.

The machine learning model 311b inputs the input image and the heatmap HM, and outputs at least one region W in this input image and the evaluation value E for each of the at least one region W, as described above. The machine learning pipeline 10 of FIG. 4 (also illustrated in FIG. 16) can output the heatmap HM, the region W, and the evaluation value E for the input of the input image, as also described above.

Thus, for the input of the input image and the attribute, the heatmap HM obtained by the machine learning pipeline 10 is set as the question, the set (W, E) of the region and the evaluation value also obtained from the machine learning pipeline 10 is set as the correct-answer data, the set (W, E) of the region and the evaluation value obtained from the machine learning model 311b is set as the prediction data, and an error 20b therebetween is obtained. The error 20b may be any error generally used in the technology of machine learning, such as the cross entropy error or the least square error. After that, an appropriate method such as the backpropagation is used to update an internal state of the machine learning model 311b.

The learning of the machine learning model 311b is executed by appropriately repeating this procedure a required number of times. The output of the heatmap HM as the correct-answer image from the machine learning pipeline 10 and the output of the heatmap HM, the region W, and the evaluation value E from the machine learning model 211 may be executed in advance, to thereby create a set of the learning data. After that, this learning data may be used to execute the learning of the machine learning model 311b. This point is similar to that of the machine learning model 311a.

In the description given above, the learning of the machine learning model 311a and the learning of the machine learning model 311b are executed independently of each other, but the learning both thereof may simultaneously be executed integrally as a pipeline. In this case, the heatmap HM input as the question to the machine learning model 311b is not the heatmap output from the machine learning pipeline 10, but the heatmap output from the machine learning model 311a.

Thus, the machine learning model 311a is obtained by the learning method of learning through use of teacher data including the input image and the attribute as a question, and the heatmap HM obtained by the machine learning pipeline 10 as an answer. Moreover, the machine learning model 311b is obtained by the learning method of executing the learning through use of the teacher data including, as the question, the heatmap HM and including, as the answer, the region W and the evaluation value E obtained from the machine learning pipeline 10, that is, including, as the question, the heatmap HM and, as the answer, the region W obtained from the learned machine learning model or the algorithm which outputs the region W for the input of the heatmap HM and the evaluation value E obtained from the learned machine learning models which output the evaluation value E for the portion of the input image corresponding to this region W.

Figure 17:
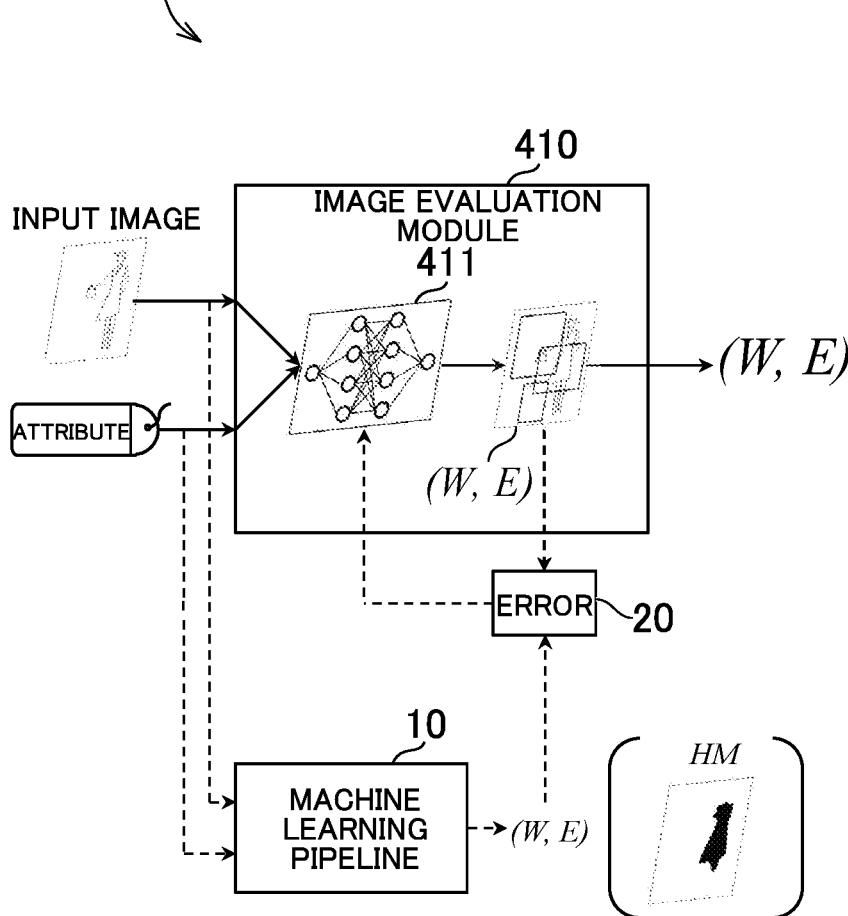
FIG. 17 is a diagram for illustrating a configuration of the information-processing device according to a third embodiment of the present invention together with an operation at the time when a machine learning model is caused to learn.

FIG. 17 is a diagram for illustrating a configuration of an information-processing device 400 according to a third embodiment of the present invention together with an operation during the learning of a machine learning model 411.

An image evaluation module 410 of the information-processing device 400 includes a single machine learning model 411. Moreover, the machine learning model 411 is caused to learn so that the set (W, E) of the region W and the evaluation value E is directly output for the input of the input image and the attribute. Thus, when the information-processing device 400 is used to evaluate an image, that is, the attribute is given to the input image, and the region W and the evaluation value E are obtained, there does not occur a state in which the heatmap HM explicitly appears, which is the case of the first embodiment and the second embodiment.

However, as is apparent from a learning method of the machine learning model 411 described now, it should be understood that, also in the image evaluation module 410 of the information-processing device 400 according to this embodiment, for a common input image, the set of the region and the evaluation value (W, E) output when one attribute is given and the set of the region and the evaluation value (W, E) output when another attribute different from the one attribute is given are different from each other.

With continued reference to FIG. 17, description is given of a method of obtaining a machine learning model 411b, that is, causing the machine learning model 411 to learn.

Also in FIG. 17, the operation of the machine learning model 411 during the learning is clarified by indicating this operation as broken lines.

The machine learning model 411 inputs the input image and the attribute and outputs the set (W, E) of the region W and the evaluation value E as described above. Moreover, the machine learning pipeline 10 of FIG. 4 (also illustrated in FIG. 17) can output the region W and the evaluation value E for the input of the input image and the attribute value, which is also described above.

Thus, the input image and the attribute are set as the question, the set (W, E) of the region and the evaluation value obtained from the machine learning pipeline 10 is set as the correct-answer data, the set (W, E) of the region and the evaluation value obtained from the machine learning model 411 is set as the prediction data, and an error 20 therebetween is obtained. The error 20 may be any error generally used in the technology of machine learning, such as the cross entropy error or the least square error. After that, an appropriate method such as the backpropagation is used to update an internal state of the machine learning model 411.

The learning of the machine learning model 411 is executed by appropriately repeating this procedure a required number of times. The output of the region W and the evaluation value E from the machine learning pipeline 10 may be executed in advance, to thereby crease a set of the learning data. After that, this learning data may be used to execute the learning of the machine learning model 411 as described above.

In the description given above, the set (W, E) of the region W and the evaluation value E is used as the correct-answer data to execute the learning of the machine learning model 411. In addition to this configuration, the heatmap HM output from the machine learning pipeline 10 may be used for learning of an intermediate layer of the machine learning model 411. That is, when the machine learning model 411 has an architecture based on the CNN, a generation layer for an attention map based on an attention mask may be provided as the intermediate layer, and intermediate layer learning in which the output attention map is used as a prediction image and the heatmap HM is used as a correct-answer image may additionally be executed. The learning can be efficiently advanced with a smaller number of repetitions by employing this machine learning mechanism.

As described above, the single machine learning model 411 is obtained by the method of executing the learning through use of the teacher data which includes the input image and the attribute and includes the region W and the evaluation value E, as the answer, obtained from the machine learning pipeline 10, that is, the region W obtained by inputting, into the learned machine learning model or the algorithm which outputs the region W for the input of the heatmap HM, the heatmap HM obtained by combining, in accordance with this attribute, the plurality of intermediate heatmaps 12 obtained from the plurality of learned machine learning models 11 which are different from one another, and generate the intermediate heatmaps 12 for the input of the input image, and the evaluation value E obtained from the learned machine learning models which output the evaluation value E for the portion of the input image corresponding to this region W.

Figure 18:
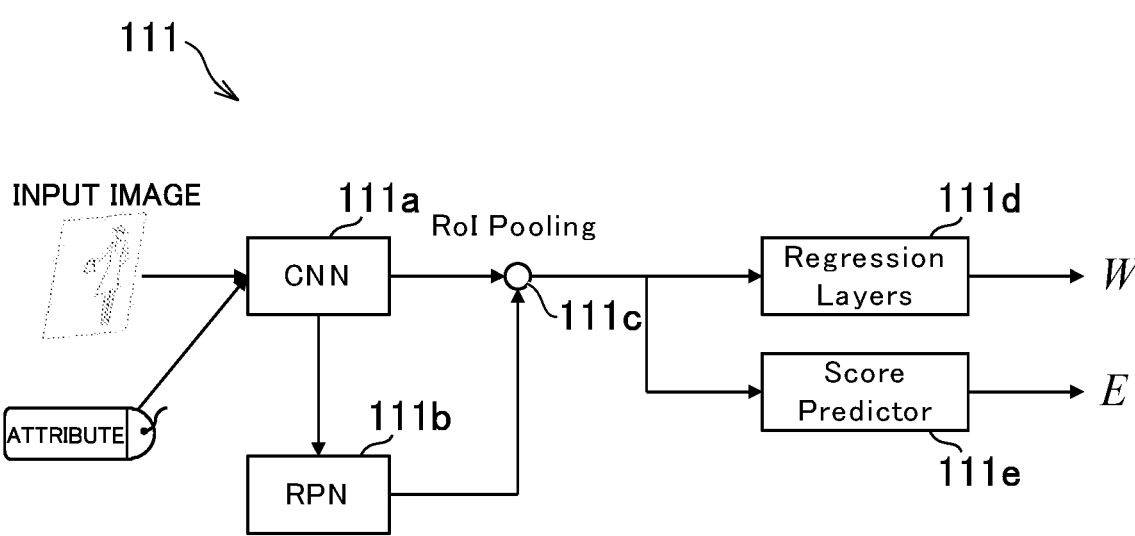
FIG. 18 is a diagram for illustrating a configuration of a machine learning model pipeline based on Faster R-CNN as an example of an architecture for implementing the machine learning model of FIG. 1.

FIG. 18 is a diagram for illustrating a configuration of a machine learning model pipeline based on the Faster R-CNN as an example of an architecture for implementing the machine learning model 111 of FIG. 1.

In the Faster R-CNN, the input image is input by a CNN 111*a*, and obtained feature maps are input into a region proposal network (RPN) 111*b*, to thereby obtain anchor boxes determined to be characteristic (at this time, redundancy is eliminated by the non-maximum suppression (NMS) or another method). The feature maps relating to the anchor boxes determined to be characteristic are normalized to a single layer by a region of interest (RoI) pooling 111*c*.

How to process the normalized feature maps relating to the anchor boxes depends on how the faster R-CNN is to be used. When the machine learning model 111 outputs the region W and the evaluation value E as in the machine learning model 411 of the information-processing device 400 according to the third embodiment, it is only required to set the CNN 111*a* to further input the attribute, and to input the normalized feature map relating to the anchor boxes into regression layers 111*d* and a score predictor 111*e*. Both of the regression layers 111*d* and the score predictor 111*e* may be CNNs. The machine learning model 111 can be caused to learn so that the region W is output from the regression layers 111*d* and the evaluation value E is output from the score predictor 111*e*.

When it is required to output, from the machine learning model 111, the $E_{CTR}$ being the evaluation value for the CTR or the aesthetic value $E_{aesthetic}$ in place of or in addition to the evaluation value E, it is only required to provide CNNs which predict the $E_{CTR}$ and the aesthetic value $E_{aesthetic}$ in place of or in addition to the score predictor 111*e*. Moreover, in order to create various machine learning models other than the machine learning model 411, it is only required to add a required layer or to delete an unnecessary layer appropriately, for example, to change the configuration of the machine learning pipeline of FIG. 18 appropriately.

Figure 19:
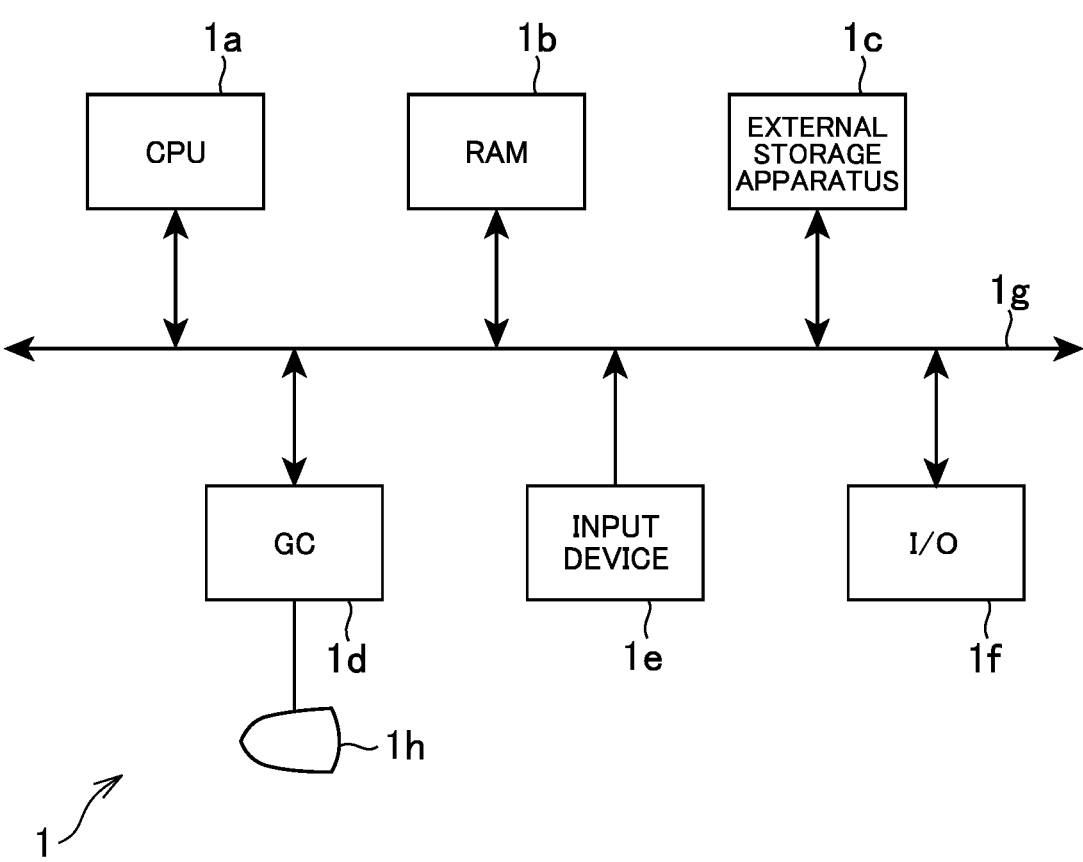
FIG. 19 is a configuration diagram for illustrating a representative physical configuration of a general computer.

The information-processing device 100, 200, 300, and 400 described above may be physically implemented through use of a general computer. FIG. 19 is a configuration diagram for illustrating a representative physical configuration of such a general computer 1.

In the computer 1, a central processing unit (CPU) 1*a*, a random access memory (RAM) 1*b*, an external storage device 1*c*, a graphics controller (GC) 1*d*, an input device 1*e*, and an input/output (I/O) 1*f* are connected through a data bus 1*g* so that electrical signals can mutually be transmitted and received. In this configuration, the external storage device 1*c* is a device which can statically record information, such as a hard disk drive (HDD) or a solid state drive (SSD). Moreover, the signal from the GC 1*d* is output to a monitor 1*h* for a user to visually recognize an image, such as a cathode ray tube (CRT) or a so-called flat panel display, and is displayed as an image. The input device 1*e* is a device for the user to input information, such as a keyboard, a mouse, or a touch panel. The I/O 1*f* is an interface for the computer 1 to transmit and receive information to and from external devices. A plurality of CPUs 1*a* may be prepared so that parallel computing is executed in accordance with a load of the information processing required to be executed by the computer 1.

An application program including an instruction sequence for causing the computer 1 to function as the information-processing device 100 is installed in the external storage device 1*c*, is read out onto the RAM 1*b* as required, and is executed by the CPU 1*a*. Moreover, this program may be recorded in an appropriate computer-readable information recording medium such as an appropriate optical disc, magneto-optical disc, or flash memory, and may then be provided, or may be provided through an information communication line such as the Internet. Moreover, the interface to be used by the user of the information-processing device 100 may be implemented on the computer 1 itself, and the user may directly operate the computer 1, may be implemented by a method of the so-called cloud computing in which general-purpose software such as a web browser is used on another computer and a function is provided from the computer 1 through the I/O 1*f*, or may further be implemented so that the computer 1 provides an application programming interface (API) available for another computer so that the computer 1 operates as the information-processing device 100 in response to a request from the another computer.

The invention claimed is:

1. An information-processing device, comprising:

a Central Processing Unit ("CPU"); and a memory storing instructions for causing the information-processing device, when executed by the CPU, to:

include at least a machine learning model configured to receive an input image and an attribute as input, and to output at least one region in the input image and an evaluation value for each of the at least one region, wherein, for a common input image, the at least one region and the evaluation value output when one attribute is given are different from the at least one region and the evaluation value output when another attribute different from the one attribute is given, wherein the instructions further cause the information-processing device to:

include, as the machine learning model, at least a heatmap output model configured to receive the input image and the attribute as input, and to output a heatmap corresponding to the attribute, receive the heatmap as input, and to extract at least one region in the heatmap, and receive a partial image of the input image corresponding to the at least one region as input, and to estimate the evaluation value for the partial image, wherein the heatmap output model is a heatmap output model obtained by causing the heatmap output model to learn through use of teacher data which includes, as a question, the input image and the attribute, and includes, as an answer, the heatmap obtained by combining, in accordance with the attribute, a plurality of intermediate heatmaps obtained from a plurality of learned machine learning models which are different from one another, and generate intermediate heatmaps for the input of the input image.

2. The information-processing device according to claim 1, wherein the instructions further cause the information-processing device to:

further include, as the machine learning model, at least a region evaluation value output model configured to receive the input image and the heatmap as input, and to output the at least one region in the input image and the evaluation value for each of the at least one region, wherein the region evaluation value output model is a region evaluation value output model obtained by causing the region evaluation value output model to learn through use of teacher data which includes, as a question, the heatmap and includes, as an answer, a region obtained from a learned machine learning model or an algorithm which outputs the region for input of the heatmap and the evaluation value obtained from a learned machine learning model which outputs the evaluation value for a portion of the input image corresponding to the region.

3. An information-processing device, comprising:

a Central Processing Unit ("CPU"); and a memory storing instructions for causing the information-processing device, when executed by the CPU, to:

include at least a machine learning model configured to receive an input image and an attribute as input, and to output at least one region in the input image and an evaluation value for each of the at least one region, wherein, for a common input image, the at least one region and the evaluation value output when one attribute is given are different from the at least one region and the evaluation value output when another attribute different from the one attribute is given, wherein the instructions further cause the information-processing device to:

include a single machine learning model as the machine learning model, wherein the single machine learning model is a machine learning model obtained by causing the machine learning model to learn through use of teacher data which includes, as a question, the input image and the attribute and includes, as an answer, a region obtained by inputting, into a learned machine learning model or an algorithm which outputs the region for input of a heatmap, a heatmap obtained by combining, in accordance with the attribute, a plurality of intermediate heatmaps obtained from a plurality of learned machine learning models which are different from one another, and generate intermediate heatmaps for the input of the input image, and the evaluation value obtained from a learned machine learning model which outputs the evaluation value for a portion of the input image corresponding to the region.

4. An information-processing method of causing a computer to execute:

training a machine learning model as a heatmap output model by causing the machine learning model to learn through use of teacher data which includes, as a question, an input image and an attribute, and includes, as an answer, a heatmap obtained by combining, in accordance with the attribute, a plurality of intermediate heatmaps obtained from a plurality of learned machine learning models which are different from one another, and generate intermediate heatmaps for input of the input image.

5. The information-processing method according to claim 4, the method further causing a computer to execute:

training a second machine learning model as a region evaluation value output model by causing the second machine learning model to learn through use of teacher data which includes, as the question, the heatmap and includes, as the answer, a region obtained from a learnedthe learned machine learning model or an algorithm which outputs the region for input of the heatmap and an evaluation value obtained from the learned machine learning model which outputs the evaluation value for a portion of the input image corresponding to the region.

6. The information-processing device according claim 1, wherein the plurality of learned machine learning models have been independently trained.

* * * * *